2,834,776

METHOD OF PREPARING HYDROLYZED CELLULOSE ACETATE BUTYRATES

Carl J. Malm and Loring W. Blanchard, Jr., Rochester, N. Y., assignors to Eastman Kodak Company, Rochester, N. Y., a corporation of New Jersey No Drawing. Application December 9, 1953
Serial No. 397,272

2 Claims. (Cl. 260—225)

This invention relates to a process for the manufacture of hydrolyzed cellulose acetate butyrates which involves dilution of the mass in which the cellulose ester is dissolved, prior to or at the beginning of the hydrolysis operation.

Various methods have been described in the prior art for the manufacture of cellulose acetate butyrates. This ester has been employed for various purposes such as for use in molding compositions or for the preparation of sheeting or film base. However, recently it has been found that when cellulose acetate butyrate is dissolved in a borderline solvent at an elevated temperature and then coated out onto a film forming surface the coating thus formed quickly sets allowing vastly increased coating speeds. A coating method of this type is described and claimed in U. S. Patent No. 2,319,052 of Fordyce et al. In that method the cellulose acetate butyrate is dissolved in a solvent such as propylene chloride-isopropyl alcohol at an elevated temperature and coated out onto a film forming surface. The coating sets almost immediately so that the sheet thus formed can be quickly stripped from the film forming surface. In this type of use it is highly desirable that the cellulose ester be of a uniform nature so that it does not contain any difficultly soluble material therein as the deviation of even a small percentage of the product from the desired solubility values may result in haziness or graininess in the solution which is formed therefrom.

One object of our invention is to provide a method of preparing hydrolyzed cellulose acetate butyrates of good uniformity. Another object of our invention is to provide a method of preparing hydrolyzed cellulose acetate butyrates which when dissolved in borderline solvents are substantially free of haziness or graininess. A further object of our invention is to provide a method of making hydrolyzed cellulose acetate butyrates in which the hydrolysis is carried out under conditions wherein the cellulose ester solution is greatly diluted with acetic acid during the hydrolysis operation. Other objects of our invention will appear herein.

We have found that the uniformity of hydrolyzed cellulose acetate butyrates is greatly improved if the hydrolysis operation is carried out with a cellulose ester solution which has been greatly diluted with acetic acid. Our invention applies to cellulose acetate butyrates in which the butyryl content is within the range of 12–50% particularly those cellulose acetate butyrates which are adapted for use in the manufacture of film base such as of 12–20% butyryl (such as obtained by an esterification where butyryl is 50–60% of the total acyl in the esterification). In the hydrolysis operation in accordance with our invention the proportion of liquid to cellulose ester during the hydrolysis operation should be within the range of 6:1 to 10:1 or even more with the preferable range being from 8:1 to 10:1. A greater dilution than 10:1 can be used but as a matter of economy we have found that the dilution specified is satisfactory and the cellulose acetate butyrate which results exhibits excellent solubility in borderline solvents and the presence of haze and grain is reduced to a minimum. It is also desirable in the preparation of cellulose acetate butyrates in accordance with our invention that the proportion of liquid to cellulose in the esterification mass be no more than 8:1 with preferably a 6:1 liquid to cellulose ratio for the operation of the esterification. It is desirable in the esterification method that the cellulose acetate butyrate be prepared by the method described and claimed in our application Serial No. 397,186 filed of even date in which 15–30% of the acetyl is withheld in the esterification until the cellulose ester reaches an apparent acetyl content of 15–25% whereupon the remainder of the acetyl may be added. The combination of this type of esterification with the dilution of the mass for the hydrolysis procedure contributes to the maximum of uniformity in the cellulose acetate butyrate which is obtained.

The hydrolysis in accordance with our invention involves the dilution of the acetic acid-butyric acid mass with acetic acid as described. Any anhydride in the completed esterification mass is converted to acid by the addition of water preferably in the form of aqueous acetic acid. Also it is desirable that additional water be added so that the acid constitutes 88–98% of the total liquid present. If the amount of catalyst present is such that the hydrolysis may proceed too rapidly it will be desirable to partially neutralize the catalyst preferably with a basic magnesium compound such as magnesium oxide or carbonate. The hydrolysis proceeds at a good rate at an elevated temperature such as 100–110° F. but if desired a higher temperature such as up to 140° or 150° F. may be employed as described in the art.

The following example illustrates the preparation of cellulose acetate butyrate carried out in accordance with our invention:

*Example*

3.5 lbs. of cotton linters were thoroughly soaked in water and the water was removed therefrom by centrifuging and displacing with butyric acid. The linters, together with sufficient butyric acid that the charge consisted of 3.5 lbs. of linters and 12.5 lbs. butyric acid, were then placed in a jacketed Werner-Pfleiderer esterification mixer. There was also added to the mixer .6 lb. of glacial acetic acid and 7 lbs. of acetic anhydride. The mass was cooled to 52° F. and there was added thereto with agitation a mixture of 72 cc. of acetic acid and 39 cc. of sulfuric acid. After two hours of reaction time the cellulose had an apparent acetyl content of 15–25% and the mass a temperature of 81° F. There was then added to the mixer 2.25 lbs. of acetic anhydride and the reaction was run a further two hours making a total reaction time of 4 hours at the end of which time the cellulose had all gone into solution. There was then added a mixture of 3.1 lbs. of water, 3.5 lbs. of acetic acid and 30 grams of magnesium carbonate which partially neutralized the sulfuric acid, the resulting mass being composed of about 6 lbs. of cellulose ester and 32 lbs. of total mass. In one procedure there was added to the mass 20 lbs. of acetic acid while in a second procedure 32 lbs. of acetic acid was added thereto, it being desirable in a procedure such as that given that 20–40 lbs. of acetic acid be added to the mass. In each case the cellulose ester was held at 100° F. for 25 hours whereby a hydrolyzed cellulose acetate butyrate was obtained. The cellulose ester so obtained was then precipitated by introducing the mass into agitated aqueous acetic acid and the precipitate was then washed and dried. In the case of each of the products obtained a product of good uniformity resulted as shown by the lack of haze and grain when dissolved in a borderline solvent. The product obtained when the 32 lbs.

acetic acid dilution was used was even better in quality than that obtained when the 20 lb. dilution was employed.

The testing of samples of cellulose acetate butyrate may be carried out by dissolving the cellulose ester in any of the borderline solvents at an elevated temperature and observing the resulting solution for haze and grain. For instance, one method for forming such a solution is to dissolve a mixture of 33 grams of the cellulose ester obtained according to the above process and 2.6 grams of triphenyl phosphate in a solvent mixture of 65 grams of propylene chloride and 35 grams of anhydrous isopropyl alcohol which solution is obtained by tumbling the mass at 150° F. for 4 hours. Another type of solution which may be prepared and examined for haze and graininess is that of a mixture of 28 grams of the cellulose ester as obtained above and 2.2 grams of triphenyl phosphate dissolved in a solvent mixture of 65 grams of ethylene dichloride, 10 grams of n-butanol and 25 grams of cyclohexane by tumbling for 4 hours at 150° F. If desired, however, the ester may be dissolved in the solvent without plasticizer and examined.

It was found in several comparative runs that there was notable improvement in the quality of the solutions of the ester prepared by a process in which there was acetic acid dilution of the hydrolysis mass over the esters from these runs in which dilution had not been employed. For instance, in one case where a hydrolyzed cellulose acetate butyrate was prepared by an esterification having a liquid to cellulose ratio of 6.1:1 the ester obtained without the acetic acid dilution had an apparent acetyl content of 41.1% as compared with another carried out with acetic acid dilution having an apparent acetyl content of 41.1%; the cellulose acetate butyrate in which the diluted hydrolysis was not used had haze and gelly lumps present in the solution thereof whereas a like solution of the ester prepared using the diluted hydrolysis was satisfactory and free from haze and grain. In another case of the preparation of cellulose acetate butyrates in which similar esterifications were used and an apparent acetyl content of approximately 40.5% was obtained in both cases the solution of the cellulose acetate butyrate prepared without the diluted hydrolysis was found to be characterized by an excess of graininess whereas the solution of the cellulose acetate butyrate prepared with the diluted hydrolysis as described herein in a like borderline solvent had excellent clarity. In still another case where 2 cellulose acetate butyrates were prepared in which the products resulting had apparent acetyl percentages of 39.6%, the solution of the cellulose acetate butyrate prepared by the conventional method when that ester was dissolved in a borderline solvent was grainy and was characterized by the presence of gelly lumps.

A like solution of the cellulose acetate butyrate which was obtained in a procedure in which a diluted hydrolysis was used was of good clarity. Our invention is particularly adapted to the preparation of cellulose acetate butyrates in which the butyryl content of the esters is within the range of 14–18% such as are often employed for the preparation of the commercial types of film bases by a high speed coating operation. By the use of cellulose acetate butyrates prepared in accordance with our invention the film base which is manufactured therefrom is characterized by good clarity uniformly throughout the sheeting so prepared.

We claim:

1. A method for preparing a hydrolyzed cellulose acetate-butyrate of good uniformity and which will dissolve in solvents therefor without haze or grain, which comprises reacting upon cellulose with an esterification bath essentially consisting, except for the catalyst, only of acetic and butyric compounds, the mol ratio of butyryl to acetyl being greater than 1, in which the liquid to cellulose ratio does not exceed 8:1, and hydrolyzing the thus prepared cellulose acetate butyrate by allowing it to stand in solution in the hydrolysis bath obtained by dilution of the spent esterification mass with acetic acid and aqueous acetic acid to the point where the ratio of liquid to cellulose ester is within the ratio of 8:1 to 10:1 by weight and acetic acid is the predominating acid therein.

2. A method of preparing a hydrolyzed cellulose acetate-butyrate of good uniformity and which will dissolve in solvents therefor without haze or grain, which comprises reacting upon cellulose with an esterification bath essentially consisting, except for the catalyst, only of acetic and butyric compounds, the mol ratio of butyryl to acetyl being greater than 1, in which the liquid to cellulose ratio does not exceed 8:1, the esterification being carried out by withholding 15–30% of the total acetyl employed until the cellulose has an apparent acetyl content of 15–25% and then completing the esterification after adding the remainder of the acetyl and following the esterification, hydrolyzing the thus prepared cellulose acetate butyrate by allowing it to stand in solution in the hydrolysis bath obtained by dilution of the spent esterification mass with acetic acid and aqueous acetic acid to the point where the ratio of liquid to cellulose ester is within the ratio of 8:1 to 10:1 by weight and acetic acid is the predominating acid therein.

References Cited in the file of this patent

UNITED STATES PATENTS

| | | |
|---|---|---|
| 2,353,423 | Tinsley | July 11, 1944 |
| 2,373,630 | Martin et al. | Apr. 10, 1945 |
| 2,553,664 | Martin et al. | May 22, 1951 |